United States Patent [19]

Dumestre, III.

[11] Patent Number: 4,970,698
[45] Date of Patent: Nov. 13, 1990

[54] SELF-CALIBRATING SONAR SYSTEM

[76] Inventor: Alex C. Dumestre, III., 21 S. Lakeshore Dr., Covington, La. 70433

[21] Appl. No.: 214,169

[22] Filed: Jun. 27, 1988

[51] Int. Cl.$^5$ .............................................. G01V 1/38
[52] U.S. Cl. ..................................... 367/19; 367/13; 367/15; 181/110
[58] Field of Search ................. 181/110–112; 367/13, 15, 19, 56, 58, 20, 16, 99, 106, 130

[56] References Cited

U.S. PATENT DOCUMENTS

| | | | |
|---|---|---|---|
| 3,906,352 | 9/1975 | Parker | 367/19 |
| 4,033,278 | 7/1977 | Waters | 114/245 |
| 4,087,780 | 5/1978 | Itria | |
| 4,187,492 | 2/1980 | Delignieres | 367/127 |
| 4,376,301 | 3/1983 | Roberts | 367/19 |
| 4,446,538 | 5/1984 | Zachariadis | 367/19 |
| 4,513,401 | 4/1985 | Barker | 367/19 |
| 4,532,617 | 7/1985 | Baecker | 367/19 |
| 4,555,779 | 11/1985 | Roberts | 367/19 |
| 4,635,236 | 1/1987 | Roberts | 367/19 |
| 4,641,287 | 2/1987 | Neeley | 367/19 |
| 4,648,080 | 3/1987 | Hargreaves | 367/20 |
| 4,660,185 | 4/1987 | French | 367/19 |
| 4,669,067 | 5/1987 | Roberts | 367/19 |
| 4,709,356 | 11/1987 | Ayers | 367/19 |

Primary Examiner—Thomas H. Tarcza
Assistant Examiner—Tod Swann

[57] ABSTRACT

A method is disclosed where acoustic pulses are used to calculate the velocity of the medium. The inventive aspect of the invention is that the acoustic velocity may be calculated without initially knowing the separation distance between the source and the distant receivers. The method utilizes established geometrical relationships which may be solved to produce the velocity. The velocity is often used to calculate the separation distances between the desired points.

8 Claims, 1 Drawing Sheet

SELF-CALIBRATING SONAR SYSTEM

BACKGROUND OF THE INVENTION

1. Field of the Invention

This invention relates to ranging techniques and particularly to a method for continuously calibrating the velocity of an acoustic signal in a medium to better determine the range and position of an object relative to a first point.

2. Discussion of the Related Art

In order to determine the distance of an object in a medium using acoustic signals, it is important to know the propagation velocity of the acoustic signal in the medium. It is well known that the velocity of an acoustic signal is affected by the density and temperature of the medium. These factors are not easily determined in real time so another technique is often used which requires that the distance between two points be known. Given a known distance, velocity is readily calculated by measuring the travel time of the acoustic signal.

In aqueous environments the acoustic velocity may be roughly approximated by reference to a table. For example a table from a physics handbook notes that the velocity of sound in seawater of temperature 20 degree Celsius is approximately 1531 meters per second. This approximation is inappropriate in instances involving large distances because of density and temperature variations. In offshore environments acoustic velocities are traditionally determined between two ships. Both ships are usually equipped with radio navigation systems which provide the exact location of each ship and thus the distance therebetween. One ship may carry the acoustic source and the other ship (slave ship) may tow a detector such as a hydrophone. With the distance known and the travel time of the signal readily measurable, the velocity calculation is elementary.

The major disadvantage to this technique is the need for a slave vessel to determine the distance. This technique also requires that the slave ship contain expensive radio navigation equipment to determine its position relative to the other vessel. Such systems are disclosed in U.S. Pat. Nos. 4,669,067, 4,641,287, 4,532,617 and 4,513,401.

Another type of position determining system utilizes several submerged transponders secured to the ocean floor at surveyed locations. Each transponder generates a distinguishable acoustic pulse upon receipt of command signal from the vessel passing overhead. The acoustic signals from each transponder are received by hydrophones housed in the towed streamer cable and on the ship. The location of each hydrophone is triangulated from the signals sent from the transponders. These types of systems do not require the velocity of sound in the water since triangulation is used.

A major disadvantage in triangulation systems is the need to deploy the transponders at surveyed points on the ocean bottom. Typically the transponders are nonrecoverable and costly. Such systems are disclosed in U.S. Pat. Nos. 4,635,236 and 4,555,779.

Another method of measuring distance is disclosed in U.S. Pat. No. 4,376,301. In this system, the velocity of sound in water is determined between the vessel and a first detector located in the end of the cable near the vessel. It is assumed that the distance between the source and the detector is a straight line and that the exact distance is known. That is the cable is paid out to the correct distance every time the cable is deployed. It is further assumed that the propagation velocity is constant along the length of the cable. Herein lies an assumption which may result in error. As the ship passes through the water, the propeller and the hull of the vessel introduce turbulence into the water which cause the water layers to swirl and mix, bringing cooler waters to the surface The cooler water may not mix effectively within the distance between the vessel and the near hydrophone, and in truth, the temperature of the water may vary considerably along the entire length of the cable. For every one degree change (Celsius) in water temperature, the velocity changes by approximately two meters per second. Depending upon the situation, the water temperature may vary to cause wide variations in the correct propagation velocity. Another disadvantage of such a system is that often, the source array used to generate the seismic signals is deployed directly behind the vessel and just ahead of the streamer cable. The acoustic source often consists of several air guns which when fired introduce large volumes of air into the water, forming bubbles of different sizes. The small bubbles are often still in the water when the streamer cable is towed past the firing point in the water. These small bubbles will cause variations is the acoustic velocity, thus the measurements from the ship to the cable may be distorted by the air.

It is an object of the present invention to provide a method for continuously calibrating the propagation velocity of an acoustic signal without the aid of a slave vessel.

It is another object of this invention to provide a method for calibrating the propagation velocity of an acoustic signal without knowing the distance between the transmitting and receiving points.

It is yet another object of the invention to provide a method for readily measuring or calculating the distance between a first and a second point without using fixed triangulation techniques.

It is still another object of this invention to provide a method for measuring distances between a first point and at least three other points located along a line laterally offset from the first point.

SUMMARY OF THE INVENTION

In accordance with one object of the invention, a method is provided which calculates the propagation velocity of the acoustic signal using travel times between several points of unknown separation.

In accordance with another object of the invention, a method is provided which calculates the separation distance between an acoustic source and several hydrophones located along at least one single streamer cable towed behind a vessel.

Generally, the method of this invention can calculate the propagation velocity of an acoustic signal in the water with substantial accuracy by measuring the travel time of the acoustic signal between a first point of known location and at least three other points located along a substantially straight line offset from the first point by an unknown distance. A computer uses the travel times to determine the propagation velocity according to an expression derived from three equations having three unknowns. The derived propagation velocity is then used by the computer to calculate the distances between the first point and each of the three points according to the known relationship between time, distance and velocity. The distance calculations may then be used to determine the locations of objects disposed along the line or disposed elsewhere nearby.

This method may be used to determine the location of streamer cables used in seismic exploration as well as other objects deployed in other mediums, i.e. air.

BRIEF DESCRIPTION OF THE DRAWING FIGURES

A better understanding of the benefits and advantages of my invention may be obtained from the appended detailed description and the drawing, wherein:

FIG. 1 is a general illustration of the preferred configuration upon which the inventive method is based; and FIG. 2 is general example of a use of the method in the art of seismic exploration.

DETAILED DESCRIPTION OF A PREFERRED EMBODIMENT

The method of this invention will be described in general terms with frequent reference to applications in the seismic field. The description of the method with respect to the field of seismic exploration by no means restricts the field of application.

Figure 1:
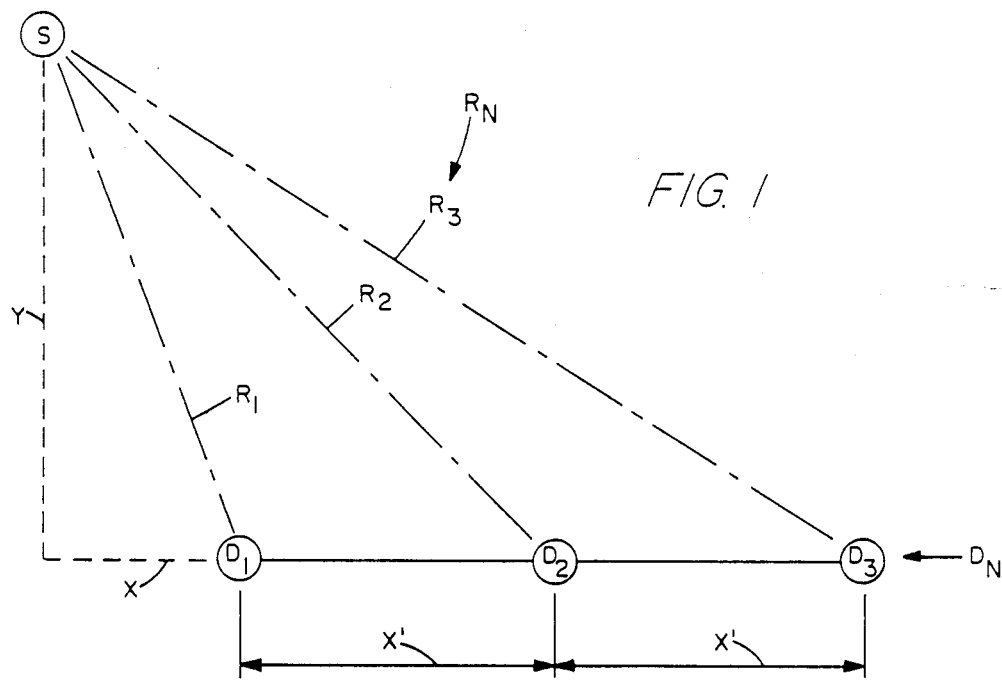

As briefly indicated above, FIG. 1 is a general illustration of the preferred configuration upon which this method is based. The Figure is of several points distributed aerially and having an unknown separation distance between a point S, an acoustic source, and detectors generally located at point $D_n$. Point S may be fixed relative to points $D_n$, or alternatively, point S may be moving with respect to points $D_n$. In seismic exploration the location of the source S is usually known to within a few feet since it is positioned close to the vessel, and the vessel usually contains radio navigation equipment to locate the vessel on the surface of the earth. In an alternate configuration the source may be located in one, or both of two streamer cables towed behind and laterally offset from the vessel. One or more detectors such as $D_n$ may be positioned close to the vessel and contained in the streamer cables as well.

As shown in the Figure, the acoustic detectors $D_1$, $D_2$ and $D_3$ may be located along a substantially straight line X at an unknown distance from the source S. The detectors are separated from each other by a known distance $X'$. At least three detectors are shown in the Figure and are preferred in this method however, more than three detectors may be utilized. The distance $X'$ may conveniently be a distance inherently designed in the system. For example in seismic exploration, $X'$ may be the length of an active streamer-cable section which is approximately 100 meters.

The above configuration may also be duplicated in a second streamer cable for two cable operations however. For the purposes of this discussion, a single line of detectors will be shown. Alternatively, a single detector and three sources may be deployed in substantially the same configuration as that shown.

From FIG. 1, a series of right triangles may be defined by extending line X to a point where a perpendicular Y may be extended to point S. Lines $R_1$, $R_2$ and $R_3$ extending between each detector $D_n$ and the source S represents the direct travel path of the acoustic signal. Lines $R_n$ also form the hypotenuse of right triangles as defined above.

Although the values of X, Y and $R_n$ are not known, can be determined using the geometrical relationships set out in the Figure. Using Pythagorean's Theorem, relationships of the sides of the triangles can be expressed in Equations (1–3) as follows:

$$R_1^2 = X^2 + Y^2 \quad (1)$$

$$R_2^2 = (X+X')^2 + Y^2 \quad (2)$$

$$R_3^2 = (X+2X')^2 + Y^2 \quad (3)$$

The distances $R_n$ can be solved for by simultaneously solving the three equations with three unknowns as will be shown below and resulting in the following expression:

$$V2 = \frac{2(x'^2)}{t_3^2 - 2t_2^2 + t_1^2} \quad (4)$$

In Equation (4), the velocity V was derived from the relationship that distance is equal to the product of the velocity and the travel time $(t_n)$ to each detector. The velocity relationship may then be used to determine the distance to each detector. In a preferred embodiment, the velocity calculation may be made at predetermined intervals such as every ten seconds. This provides a constant update of the acoustic velocity.

Using the above relationships, an example is provided below which illustrates the feasibility of this method. The following assumptions are necessary to this method: (1) lines X and Y form substantially a right angle with respect to point S, and 2) points $D_n$ substantially lie along a straight line. Using Equations (1)-(3) above, each may be rewritten as:

$$Y^2 = R_1^2 - X^2 \quad (5)$$

$$Y^2 = R_2^2 - (X+X')^2 \quad (6)$$

$$Y^2 = R_3^2 - (X+2X')^2 \quad (7)$$

Expanding Equations (5)–(7) using the value of 100 for $X'$ set out above results in the expressions:

$$Y^2 = R_1^2 - X^2 \quad (8)$$

$$Y^2 = R_2^2 - X^2 - 200X - 10,000 \quad (9)$$

$$Y^2 = R_3^2 - X^2 - 400X - 40,000 \quad (10)$$

To determine the three variables $R_n$, Equation (8) is subtracted from Equations (9) and (10) resulting in the expressions:

$$10,000 = R_2^2 - R_1^2 - 200X \quad (11)$$

$$40,000 = R_3^2 - R_1^2 - 400X \quad (12)$$

To eliminate the variable X, Equation (11) is multiplied by a constant and subtracted from Equation (12) resulting in the expression $$20,000 = R_3^2 - 2R_2^2 + R_1^2 \quad (13)$$

The acoustic velocity is determined by substituting velocity (V) multiplied by the travel time $(t_n)$ for $R_n$ in Equation (13) resulting in the expression:

$$20,000 = V^2(t_3^2 - 2t_2^2 + t_1^2) \quad (14)$$

Equation (14), when solved for velocity V results in Equation (4) provided above.

The above calculations may be made in real time by interfacing all of the detectors $D_n$, and the source S with a computer in a manner well known in the industry of seismic exploration. The computer may control the firing time of the source, determine the arrival time of the signal to each detector, and calculate the acoustic velocity and distance to the detectors using the above equations. These calculations may be made at intervals to be determined by the operator. Typical time intervals may range from ten seconds up to as long as one minute The computer may output the velocity and range data on a computer tape for later processing.

The assumption that lines X and Y form a right angle holds substantially true for measurements made within the first few hundred meters of cable behind the tow point. Errors less than 0.5 percent are substantially consistent using this technique for calculating the velocity and range over cable lengths of several thousand meters.

Figure 2:
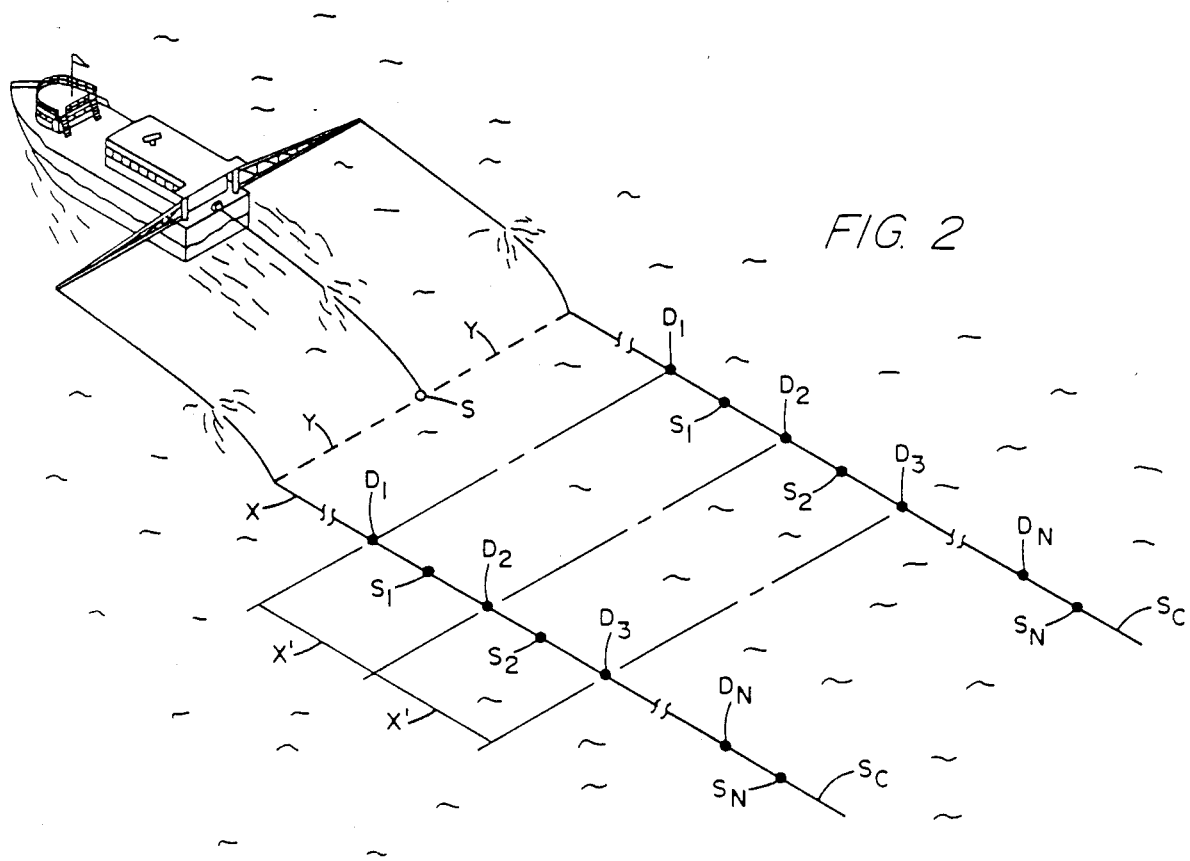

As shown in FIG. 2, the above method may also be employed to calculate the separation distance between two or more cables towed behind a single vessel. Several sources ($S_1$, $S_2$, ... $S_n$), and receivers ($D_1$, $D_2$, ... $D_n$) may be positioned along the lengths of the streamer cables (SC) towed behind and laterally offset from the stern of the vessel. The sources may be actuated sequentially with the receivers along the lengths receiving the signals. Monitoring of the firing time and the arrival times of the signals at the detectors can provide the same range information as outlined above.

As briefly mentioned above, this method has been described with certain specificity to applications in the field of seismic exploration. Those skilled in the art will find this method applicable to other situations outside the seismic field, which is considered to be within the scope of this invention limited only by the appended claims

I claim:

1. A method for calculating an unknown separation distance between a first pint and at least three points located at fixed intervals along a substantially straight line, comprising the steps of:
    a. measuring a travel time of an acoustic signal between the first point and each of the three points located along the line;
    b. calculating an acoustic velocity of the acoustic signal using a relationship between the fixed interval and the travel times of the acoustic signal from the first point to each of the three points; and
    c. calculating the product of the calculated acoustic velocity and the travel time between the first point and each of the three points to determine the unknown separation distance between the first point and each of the three points along the line.

2. A method for calculating an acoustic velocity and separation distance between a first point and at least three points located at fixed intervals along a substantially straight line having an unknown offset from the first point, comprising the steps of:
    a. generating an acoustic signal at the first point and measuring the travel time to each of the three points located along the line;
    b. calculating an acoustic velocity of the acoustic signal between the first point and the three points according to $$V = \frac{2(X^2)}{t_3^2 - 2t_2^2 + t_1^2}$$

a relationship between the fixed interval between each of the three points and the travel time of the acoustic signal to each of the three points along the line; and
    c. calculating the separation distance between each of the three points and the first point by multiplying the calculated acoustic velocity with the measured travel time for the acoustic signal to travel from the first point to each of the three points located along the line.

3. A method for calculating the separation distance between a first point and at least three points located at known intervals along a substantially straight line of unknown separation from the first point, comprising the steps of:
    a. generating an acoustic signal at each of the three points located along the line and measuring the travel time from each of the three points to the first point;
    b). calculating an acoustic velocity of the acoustic signal between each of the three points and the first point according to the expression:

$$V2 = \frac{2(X^2)}{t_3^2 - 2t_2^2 + t_1^2}$$

where V is the acoustic velocity of the acoustic signal between each of the three points and the first point; X' is the fixed interval between the three points along the line; and $t_n$ is the travel time from each of the respective three points to the first point; and
    calculating the separation distance between each of the three points and the first point by multiplying the calculated velocity with the travel time from each of the three points to the first point.

4. An apparatus for calculating the separation distance between a first point, and at least three other points located at fixed intervals along a substantially straight line having an unknown offset from the first point, comprising:
    a. an acoustic source located at said first point;
    b. at least three acoustic signal detectors, one each located at each of the three other points located along said straight line;
    c. means for measuring a travel time of an acoustic signal between said acoustic source and each acoustic signal detector; and
    d. processor means, associated with the means for measuring the travel time, for calculating the velocity of the acoustic signal according to the expression:

$$V2 = \frac{2(X^2)}{t_3^2 - 2t_2^2 + t_1^2}$$

where V is the acoustic velocity and $t_n$ is the travel time of the acoustic signal to each acoustic signal detector, and calculating the separation distance between the acoustic source and the three acoustic signal detectors by multiplying the acoustic velocity with the travel time between each of the three acoustic detectors and the acoustic source.

5. The apparatus of claim 4, further comprising:

a. a cable, containing each of the acoustic signal detectors along its length at known intervals, to be towed through a body of water;

b. a second cable containing the acoustic source towed at an unknown distance from the cable containing the acoustic signal detectors; and c. a vessel for towing the first and second cable through the body of water.

6. An apparatus for calculating the separation distance between a first point, and at least three other points located at fixed intervals along a substantially straight line having an unknown offset from the first point, comprising:

a. an acoustic detector located at said first point;

b. at least three acoustic sources, on each located at each of the three points located along said straight line;

c. means for measuring a travel time of an acoustic signal between each of said acoustic sources and said acoustic detector; and d. processor means, associated with the means for measuring the travel time, for calculating the velocity of each acoustic signal according to the expression:

$$V^2 = \frac{2(X'^2)}{t_3^2 - 2t_2^2 + t_1^2}$$

where V is the acoustic velocity and $t_n$ is the travel time of the acoustic signal to each acoustic signal detector, and calculating the separation distance between the acoustic source and the three acoustic signal detectors by multiplying the acoustic velocity with the travel time between each of the three acoustic detectors and the acoustic source.

7. The method as defined in claim 1, wherein the relationship between the fixed interval and the travel times of the acoustic signal from the first point to each of the three points, and used to calculate the acoustic velocity is represented by the expression:

$$V^2 = \frac{2(X'^2)}{t_3^2 - 2t_2^2 + t_1^2}$$

where V is the acoustic velocity of the acoustic signal; X' is the fixed interval between each of the three points located along the line; and $t_n$ is the travel time of the acoustic signal between each of the respective three points and the first point.

8. The method as defined in claim 2, wherein the relationship used to calculate the acoustic velocity of an acoustic signal propagating between the first point and each of the three points is represented by the expression:

$$V^2 = \frac{2(X'^2)}{t_3^2 - 2t_2^2 + t_1^2}$$

where V is the velocity of the acoustic signal; X' is the fixed interval between each of the three points; and $t_n$ is the travel time of the acoustic signal to each of the three points along the line.

* * * * *